March 7, 1944.　　J. H. McELROY ET AL　　2,343,237
ELECTRIC ERASER
Filed Sept. 16, 1943　　2 Sheets-Sheet 1
FIG. 1
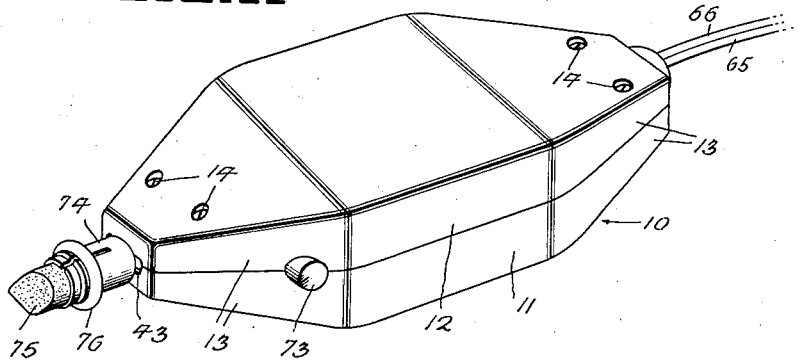
FIG. 2
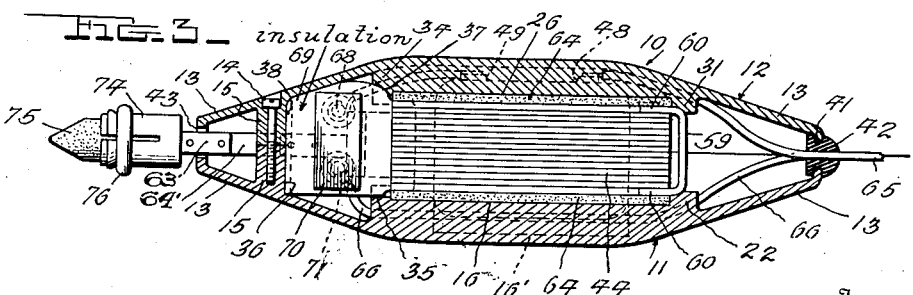
FIG. 3
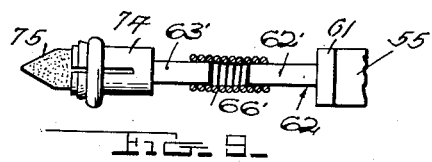
FIG. 9
Inventors
J. H. McElroy
F. W. Kalkhuis.
By
Attorney March 7, 1944.   J. H. McELROY ET AL   2,343,237
ELECTRIC ERASER
Filed Sept. 16, 1943   2 Sheets-Sheet 2
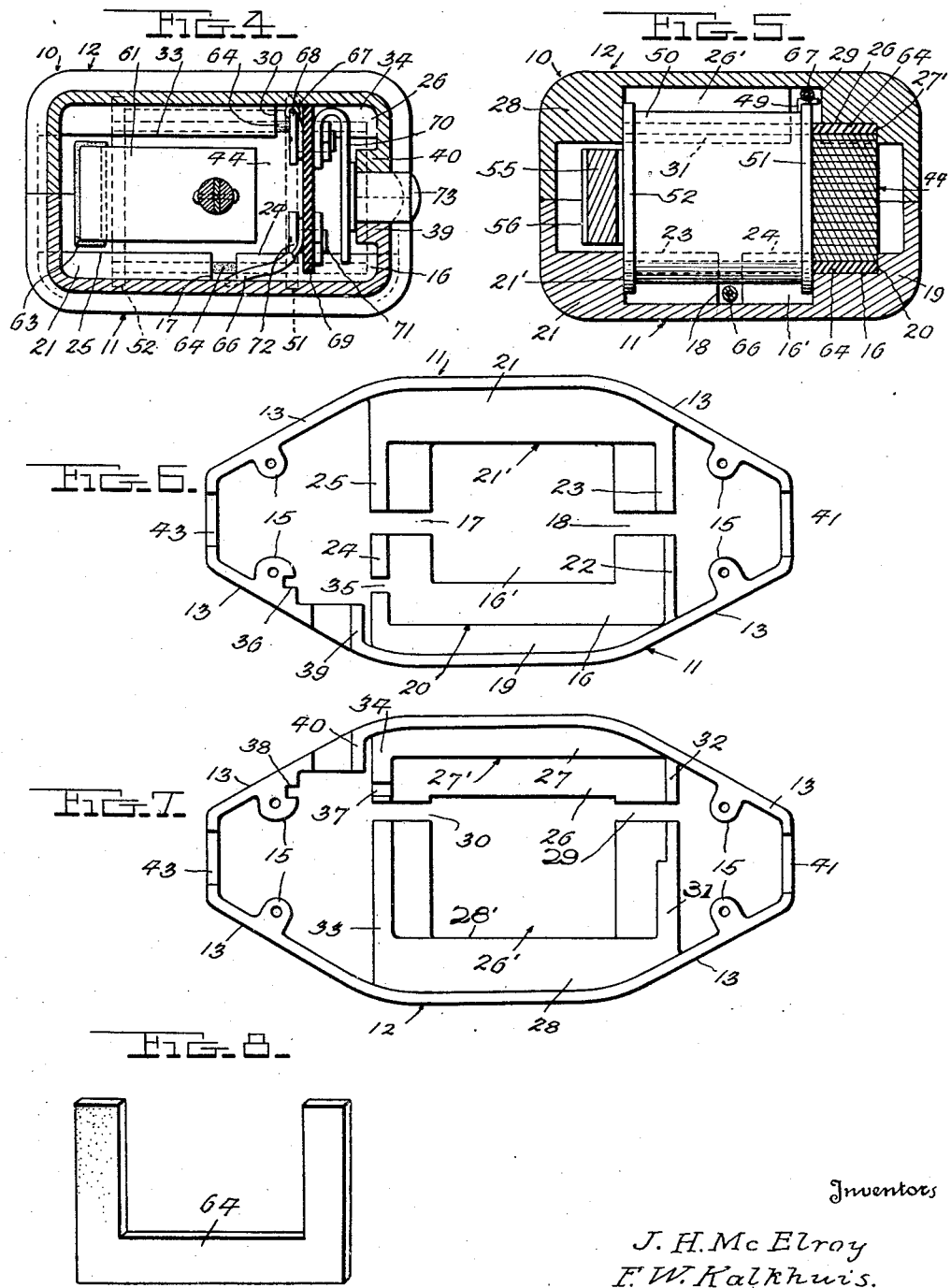
Inventors
J. H. McElroy
F. W. Kalkhuis.

Patented Mar. 7, 1944

2,343,237

UNITED STATES PATENT OFFICE 2,343,237

ELECTRIC ERASER

John H. McElroy, Pearl River, and Fred W. Kalkhuis, Orangeburg, N. Y.

Application September 16, 1943, Serial No. 502,680

12 Claims. (Cl. 120—36)

Our invention relates to electrically operated erasers.

An important object of the invention is to provide a power driven eraser which will not burn through the paper during the erasing operation which is encountered in connection with the rotary type of power driven erasers.

A further object of the invention is to provide a power driven vibratory eraser, so constructed that any excess pressure that may be applied to the eraser element, will arrest the movement of the eraser element while the reciprocatory motor continues to operate, thus preventing liability of the paper being burned through.

A further object of the invention is to provide a mechanical eraser, which will produce the natural manual or hand motion movement of the eraser element, but at a greatly increased speed and with the minimum of manual effort involved.

A further object of the invention is to provide an eraser of the above mentioned character the operating unit of which is held in place within the casing by shock absorbing means.

A further object of the invention is to provide an operating unit including a vibrating arm extending longitudinally of the casing substantially centrally thereof.

A further object of the invention is to provide a device of the above mentioned character, which is simple in construction, reliable in operation and convenient to use.

Other objects and advantages of the invention will be apparent during the course of the following description.

In the accompanying drawings forming a part of this application and in which like numerals are employed to designate like parts throughout the same, Figure 1 is a perspective view of an eraser embodying our invention, Figure 2 is a plan view of the same, with the upper longitudinal casing section removed, Figure 3 is a longitudinal section taken on line 3—3 of Figure 2, Figure 4 is a transverse section taken on line 4—4 of Figure 2, Figure 5 is a similar view taken on line 5—5 of Figure 2, Figure 6 is a plan view of the lower longitudinal casing section, Figure 7 is a bottom plan view of the upper longitudinal casing section, Figure 8 is a perspective view of one of the shock absorbing elements, and Figure 9 is a side elevation of the vibratory arm having a modified form of resilient coupling connected therein.

In the drawings, wherein for the purpose of illustration are shown preferred embodiments of our invention, the numeral 10 designates a casing which may be conveniently held in the hand of the user. This casing includes separate longitudinal companion casing sections 11 and 12. Each casing section includes ends 13, tapering outwardly, as shown. The casing sections are securely held together by screws 14, engaging lugs 15, as shown.

The bottom longitudinal casing section 11 is provided interiorly with a U-shaped web or rib 16, formed integral therewith. This U-shaped web is provided with front and back longitudinal grooves 17 and 18. At the base or closed end of the web 16 is a longitudinal web 19, projecting above the web 16 and forming a shoulder 20. At the open end of the U-shaped web 16 is a longitudinal web 21, disposed at the elevation of the web 19. Web 21 forms a shoulder 21'. Transverse webs 22 and 23 are disposed at the rear end of the U-shaped web 16 and project above the elevation of the web 16 and these webs 22 and 23 have the same elevation. Transverse webs 24 and 25 are disposed at the forward end of the U-shaped web 16 and project above the elevation of the web 16, and webs 24 and 25 have the same elevation, as shown.

The upper longitudinal casing section 12 has a U-shaped web 26, formed integral therewith. At the closed end of the web 26 is a longitudinal web 27, projecting downwardly below the web 26 and forming a shoulder 27' and at the open side of the U-shaped web 26 is a longitudinal web 28, projecting downwardly below the web 26 forming a shoulder 28' and the webs 27 and 28 extend down to the same elevation. The U-shaped web 26 has longitudinal grooves 29 and 30. At the rear end of the U-shaped web 26 are transverse webs 31 and 32, projecting downwardly below the web 26 and terminating at the same elevation. At the forward end of the U-shaped web 26 are transverse webs 33 and 34, projecting downwardly below the web 26 and terminating at the same elevation.

The web 24, Figure 6, has a vertical notch 35, arranged opposite a vertical notch 36, formed in one lug 15, while the web 34, Figure 7, has a vertical notch 37 disposed opposite a vertical notch 38 formed in one lug 15. When the upper longitudinal casing section is assembled upon the lower casing section, vertical notch 37 is in alignment with vertical notch 35 and vertical notch 38 is in alignment with vertical notch 36 and the web 28 engages web 21. The lower casing section is provided upon one side of the tapered end 13 with a semi-cylindrical boss 39 to register with a semi-cylindrical boss 40 formed upon the tapered end of the upper casing section, when the casing sections are assembled to form a tubular boss. At their rear ends, the casing sections have semi-cylindrical openings 41, which when assembled form an opening to receive a tubular button 42, and the forward ends of the casing sections have semi-elliptical openings 43, which when assembled form an elliptical opening for the passage of the vibrating arm. The U-shaped web 16 has a main recess 16' and the U-shaped web 26 has a main recess 26'.

The reciprocatory or vibratory operating mechanism is mounted as a unit within the casing and includes an electro-magnet, preferably operating with alternating current. This electro-magnet includes a U-shaped laminated core 44, having a central core portion 45. The laminations are held together by rivets 46, serving for this purpose alone, as these rivets do not attach to the casing sections or other elements. A coil 47 surrounds the core portion 45, and has terminals 48 and 49. This coil is covered by an insulating sheathing 50 and there are insulating disks 51 and 52, at the ends of the coil and these insulating disks have openings for receiving the ends of the core portion 45. The winding 47 and its insulating disks 51 and 52 are arranged within the recesses 16' and 26' and the U-shaped core 44 registers with the U-shaped webs 16 and 26. The numeral 55 designates an armature, extending longitudinally within the casing and arranged at the free end of the core portion 45 of the electro-magnet. This armature is rigidly secured to a suitably stiff spring 56, bent at a right angle at 57, to form a transverse portion 58. This transverse portion 58 is fixedly secured to a U-shaped attaching elment 59, having knuckles 60, arranged upon the top and bottom of the U-shaped core 44 and rigidly attached thereto by the rivets 46. The adjacent portions of the laminations are preferably cut away to provide recesses for receiving the knuckles 60 so that these knuckles are flush with the upper and lower surfaces of the core 44. The longitudinal armature 55 is bent at a right angle, at its forward end to provide a transverse arm 61, which is rigid, and has a longitudinal arm 62 rigidly secured thereto. This arm operates within the elliptical opening formed by the openings 43. The armature 55 is provided at its forward end with a shock absorbing sleeve 63, formed of rubber or the like, and adapted to strike against the adjacent end of the core 44, to avoid noise. The arm 62 includes a rear section 62' and a forward section 63' and these sections have longitudinal slots to receive a strip 64', rigidly attached to the sections 62' and 63' by rivets 65' or the like. The strip 64' is arranged vertically on edge, and this strip 64' is rigid vertically or edgewise and resilient laterally or horizontally. While the strip 64' is resilient laterally it is sufficiently stiff laterally whereby it will not perceptibly flex during the normal operation of the eraser element. However, when undue pressure is applied to the eraser element the resilient strip 64' will flex laterally, thus allowing the eraser element to remain at rest, while the reciprocatory motor is still operating. Since the strip 64' is stiff vertically or edgewise it does not interfere with the application of the selected pressure upon the eraser element.

In Figure 9 we have shown a modification of the invention. In this figure, the arm sections 62' and 63' are connected by a suitably stiff coiled spring 66'. This spring is sufficiently stiff so that it will not perceptibly flex during the normal operation of the eraser but when undue pressure is applied to the eraser, the spring 66' will flex whereby the eraser will remain stationary while the reciprocatory motor continues to operate.

When the core 44 and associated elements are arranged in position within the casing sections, U-shaped shock absorbing elements 64 are arranged beneath and above the U-shaped core, and substantially register and contact therewith. These U-shaped shock absorbing elements are formed of soft rubber or other suitable compressible material. The lower U-shaped shock absorbing element 64 rests upon the U-shaped web 16 while the upper shock absorbing element 64 is arranged beneath the U-shaped web 26. When the casing sections are rigidly held together by the screws 14, these U-shaped shock absorbing elements are pressed against the U-shaped core 44 and hold the same in place, without the use of additional connecting means between the core and casing sections. These U-shaped elements absorb the vibration and shocks caused by the operation of the electromagnet.

Lead wires 65 and 66 pass through the tubular button 42. The lead wire 65 passes through the groove 29 and is connected with the terminal 48. The terminal 49 is connected with a wire 67, extending through the groove 30, and connected with a binding post 68, mounted upon an insulating panel 69. The binding post 68 carries a resilient contact 70, arranged to engage a stationary contact 71, mounted upon the lower end of the insulating panel 69 and connected with a binding post 72. The binding post 72 is connected with the lead wire 66, and this lead wire extends through the grooves 17 and 18. The insulating panel 69 is vertically arranged and has its rear end inserted in a vertical notch 69' in the core 44 and in the vertical notches 35 and 37, while the forward end of this panel is inserted within the vertical notches 36 and 38. The panel is held in position by virtue of being inserted within these notches. A push button 73 is slidably mounted within the tubular boss formed by the bosses 39 and 40 and extends to the exterior of the casing and has its inner flanged end engaging the resilient contact 70, tensioned to disengage the contact 71.

Rigidly secured to the forward end of the arm section 63' is a socket 74, receiving an eraser element 75, formed of rubber or other suitable material. The eraser element 75 is relatively short and is sufficiently stiff so that it does not flex perceptibly in use. The socket is preferably slit, so that it is rendered suitably resilient and may be circumferentially contracted by a ring 76 or the like. This will permit of the removal of the eraser element 75, when desired, and properly holding the same within the socket, during operation.

The operation of the device is as follows:

When the button 73 is forced inwardly, the contact 70 engages the contact 71 and the circuit is closed. Alternating current being used, the current will pass through the wire 65, binding post 48, winding 45, binding post 49, wire 67, binding post 68, contact 70, contact 71, and through wire 66 back to the opposite pole of the source of current. The electro-magnet will therefore be alternately energized and deenergized and the armature 55 will vibrate rapidly. This vibration is transmitted to the arm 61, vibrating the longitudinal arm 62 laterally. The operator may now bring the eraser element 75 into contact with the work while holding button 73 depressed, and the eraser will therefore fulfill its function. As soon as the button 73 is released the circuit will be opened. The U-shaped shock absorbing elements 64 yieldingly hold the electromagnet to the casing sections, against displacement, and absorbing shocks. The arm or rod 62 extends longitudinally of the casing and centrally thereof and all parts of the device are well balanced. When undue downward pressure is applied to the eraser element 75, the strip 64' will flex laterally, whereby the eraser element 75 remains stationary, while the reciprocatory motor continues to operate. This will prevent the eraser element burning the paper. Since the strip 64' is rigid vertically, it does not interfere with the selected pressure applied to the eraser element.

It is to be understood that the forms of the invention herewith shown and described are to be taken as preferred examples of the same and that various changes in the shape, size, and arrangement of parts may be resorted to without departing from the spirit of our invention or the scope of the subjoined claims.

Having thus described our invention, what we claim is:

1. In an electric eraser, a support to be held in the hand, an electro-magnet mounted upon the support and including a transverse vibrating member, a resilient arm extending longitudinally of the support substantially centrally thereof and attached to the transverse member, and an eraser holder carried by the resilient arm.

2. In an electric eraser, a support to be held in the hand, an electro-magnet including a U-shaped core mounted upon the support, an armature extending longitudinally of the support adjacent to the U-shaped core, a spring secured to one end of the armature and secured to the adjacent end of the U-shaped core, a transverse arm secured to the opposite end of the armature and arranged in advance of the U-shaped core, a longitudinal arm secured to the transverse arm and projecting forwardly beyond the support and including a resilient part between its ends, and an eraser holder carried by the free end of the longitudinal arm.

3. In an electric eraser, a casing to be held in the hand, an electro-magnet mounted within the casing and including a U-shaped core, an armature extending longitudinally within the casing at one side of the core, a spring attached to the rear end of the armature and extending transversely of the U-shaped core and secured to the rear end of the core, a transverse arm secured to the forward end of the core and arranged in advance of the core, a longitudinal rod rigidly secured to the transverse arm and arranged adjacent to the central longitudinal axis of the casing and extending forwardly beyond the casing, said rod including inner and outer sections and a resilient element connecting the sections, and an eraser holder secured to the outer section.

4. In an electric eraser, a casing to be held in the hand, an electro-magnet mounted within the casing and including a U-shaped core, an armature extending longitudinally within the casing adjacent to the core and having its forward end bent at substantially a right angle to provide a transverse arm arranged in advance of the core, a spring secured to the rear end of the armature and bent at substantially a right angle to provide a transverse portion disposed rearwardly of the U-shaped core and attached to the rear end of the same, a longitudinal arm rigidly secured to the transverse arm and disposed adjacent to the central longitudinal axis of the casing, said arm including inner and outer sections and a resilient strip connecting the sections and arranged vertically on edge, an eraser holder secured to the outer section, and means to supply current to the electro-magnet.

5. In an electric eraser, a casing to be held in the hand and including longitudinal casing sections, said casing sections having internal U-shaped webs, an electro-magnet mounted within the casing and including a U-shaped core, an armature extending longitudinally within the casing adjacent to the core, the U-shaped core substantially registering with the U-shaped webs, U-shaped shock absorbing elements arranged between the U-shaped core and the U-shaped webs, means to connect the casing sections and draw them together, a spring connecting the rear end of the armature and the rear end of the U-shaped core, a longitudinal arm connected with the forward end of the armature, said arm including inner and outer sections having longitudinal slots formed therein and a resilient strip held within the slots and arranged vertically on edge, the strip being rigid edgewise and laterally resilient, and an eraser holder secured to the outer section.

6. In an electric eraser, a casing to be held in the hand and including longitudinal casing sections, said casing sections having internal U-shaped webs, said U-shaped webs forming recesses, a U-shaped core having an inner core portion, a winding carried by the inner core portion, an armature extending longitudinally of the U-shaped core, yielding means connecting the rear end of the armature and the rear end of the U-shaped core, the U-shaped webs and the U-shaped core substantially registering, U-shaped resilient elements arranged between the U-shaped webs and the U-shaped core, means to secure the longitudinal casing sections together, said arm including inner and outer sections and a resilient element connecting the sections, and an eraser holder secured to the outer section.

7. In an electric eraser, a casing including longitudinal casing sections, said casing sections having U-shaped webs, a U-shaped core within the casing and having an inner core portion, a winding carried by the inner core portion, the U-shaped webs and the U-shaped core substantially registering, an armature arranged adjacent to the U-shaped core and having its rear ends attached to the U-shaped core, a longitudinal arm secured to the forward end of the armature, said arm including inner and outer sections and a resilient element connecting the sections, an eraser holder attached to the outer section, U-shaped shock absorbing elements arranged between the U-shaped webs and the U-shaped core, the U-shaped core being provided at its forward end with a notch, one casing section being provided at its forward end with a notch, an insulating panel having its ends held in the notches, a switch mounted upon the panel, and means electrically connecting the switch and winding.

8. In an electric eraser, a casing, an electro-magnet to be operated by alternating current mounted within the casing, said electro-magnet including a laminated core, a winding for the core, a movable armature adjacent to the core, an arm secured to the armature to be moved thereby and being resilient between its ends, and an eraser holder secured to the arm.

9. In an electric eraser, a support, an electric motor mounted upon the support embodying a laterally reciprocatory part, an arm secured to the laterally reciprocatory part to be laterally reciprocated by such part, said arm having a resilient portion between its ends, and an eraser holder secured to the outer end of the arm, the resilient portion being suitably stiff so that it will flex only when undue pressure is applied to the eraser element, whereby the eraser element may be held stationary and the motor continues to operate.

10. In an electric eraser, a support, an electric motor mounted upon the support embodying a vibratory element, an arm section secured to the vibratory element, a second arm section, a coiled spring connecting the inner ends of the arm sections, and an eraser holder carried by the outer arm section.

11. In an electric eraser, a support to be held in the hand and moved toward the work, an electric motor mounted upon the support and including a reciprocatory part, and a resilient element mounted upon the reciprocatory part, said resilient element being flexible in the direction of movement of the reciprocatory part, said resilient element having means for holding an eraser.

12. In an electric eraser, a support to be held in the hand and moved toward the work, an electric motor mounted upon the support and including a reciprocatory part, and a resilient element mounted upon the reciprocatory part, said resilient element being flexible in the direction of movement of the reciprocatory part and being stiff in a direction toward the work, said resilient element having means for holding an eraser.

JOHN H. McELROY.
FRED W. KALKHUIS.